G. HOSKINS.
Farm-Gates.
No. 152,288.　　　　　　　　　　Patented June 23, 1874.
Fig: 1.
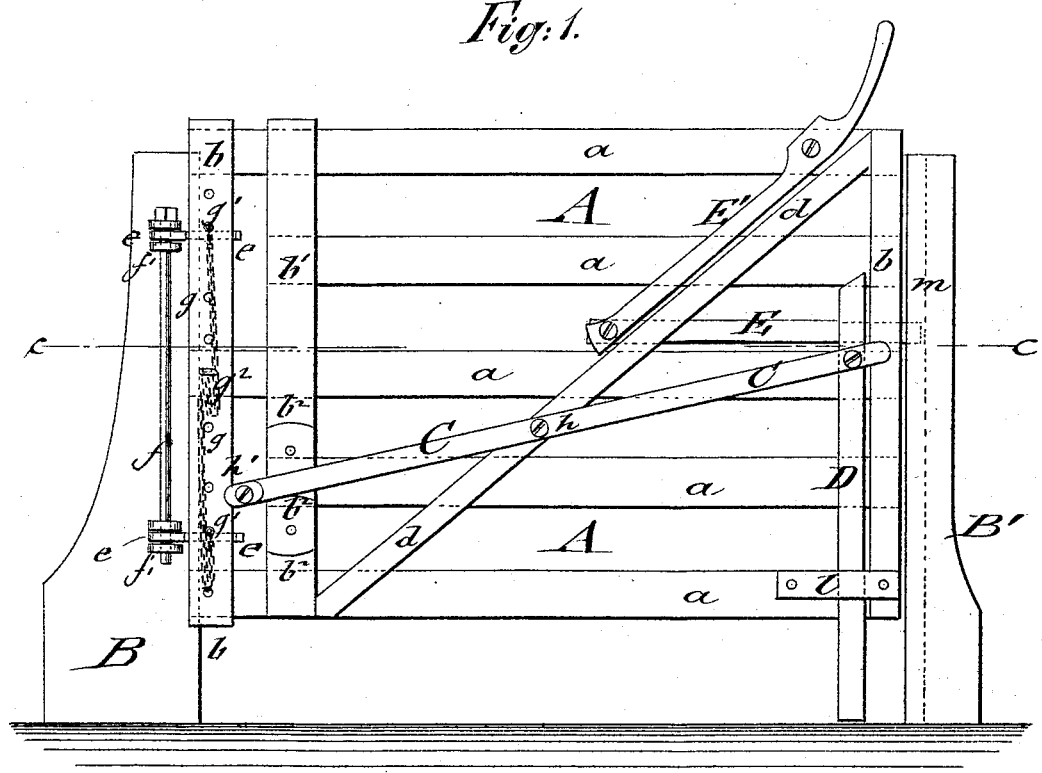
Fig: 2.
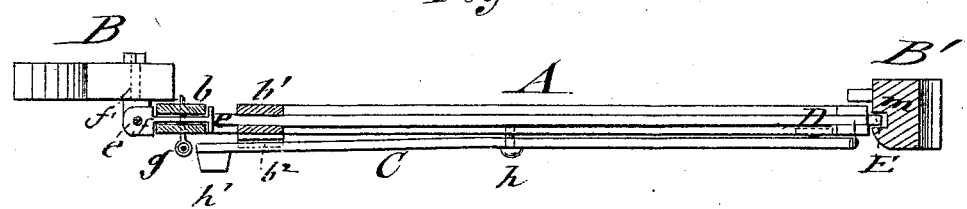
WITNESSES:　　　　　　　　　INVENTOR:
　　　　　　　　　　　　　　　G. Hoskins
　　　　　　　　　　　　　BY
　　　　　　　　　　　　　　　ATTORNEYS.

UNITED STATES PATENT OFFICE

GEORGE HOSKINS, OF GILEAD, MISSOURI.

IMPROVEMENT IN FARM-GATES.

Specification forming part of Letters Patent No. 152,288, dated June 23, 1874; application filed March 14, 1874.

*To all whom it may concern:*

Be it known that I, GEORGE HOSKINS, of Gilead, in the county of Lewis and State of Missouri, have invented a new and Improved Gate, of which the following is a specification:

In the accompanying drawing, Figure 1 represents a front elevation of my improved gate; and Fig. 2, a horizontal section of the same on the line $c\ c$, Fig. 1.

Similar letters of reference indicate corresponding parts.

The object of my invention is to construct an improved gate for farm and other purposes, which may be readily raised for the passage of small stock, and also in winter for swinging freely above the snow, being easily handled by any person on account of its simplicity of construction and ready motion. My invention consists of a gate which slides by its double end piece along T-shaped pieces hinged to the main post, and is retained thereon by pins passing through perforations of the end pieces. A lever pivoted near the middle part of the gate raises the gate by its pivoted upright rod near the fore end of the lever, while the rear end of the same locks into notches of the gates for the adjusting of the supporting-pins.

In the drawing, A represents the gate, constructed of horizontal pieces $a$, vertical end pieces $b$, and diagonal stiffening-pieces $d$. Gate A is hinged to the gate-post B by means of T-shaped pieces $e$, which swing by their ring-shaped ends on rod $f$ between staples $f'$ of the post. The double end piece $b$ of gate A slides on the T-pieces $e$, the bridge part of the same retaining the gate steadily and firmly, as shown in Fig. 2. Perforations $g$ of end pieces $b$ serve to insert pins $g^1$ for supporting the gate at any desired height on the T-pieces. Pins $g^1$ are attached by chains $g^2$ to a staple of the end piece $b$. A second upright parallel piece, $b^2$, near the double end piece $b$, is provided with projections or notches, $b^2$, as desired, for holding the rear end of lever C in position. Lever C is fulcrumed at $h$ near the middle part of the gate to the diagonal or other piece, and swings in upward or downward direction by handle $h'$ at rear end. An upright piece, D, is pivoted to the opposite end of lever C, and guided in a recessed piece, $l$. It serves to raise the gate A when the handle end of lever C is carried up, the weight of the gate resting thereon till lever C is placed and supported in projections or notches $b^2$ of piece $b^1$, and the pins $g^1$ inserted above the hinged T-pieces $e$, so that the lever C and piece D may be swung back into position along the gate without interfering with the opening of the gate. The gate remains closed while being adjusted to the requisite height by latch E sliding in a groove, $m$, of the opposite gate-post B'. Latch E is pivoted to a handle, E', which is again pivoted to gate, and allows the opening of the gate by the withdrawal of the latch without detaching it during the operation of raising the gate.

The adjustment of the gate for the passage of small stock above the snow or other purposes is easily and quickly accomplished, and a simple and neatly swinging farm-gate obtained thereby.

Having thus described my invention, what I claim as new, and desire to secure by Letters Patent, is—

1. In a lifting and swinging gate, the T-shaped hinges $e$, fitted between the slotted end bars $b$, and having loops or eyes at their rear ends, turning between keepers $f'$ on the pintle or axis-rod $f$, as and for the purpose specified.

2. The gate A, sliding on hinged T-pieces $e$, combined with pivoted lever C and end piece D, for raising and supporting gate, as described.

GEORGE HOSKINS.

Witnesses:
 CALVIN H. ANTRAM,
 WILLIAM BANKSON.